D. R. RADFORD.
RETREAD FOR TIRES AND METHOD OF MAKING THEM.
APPLICATION FILED OCT 20, 1921.
1,426,672. Patented Aug. 22, 1922.
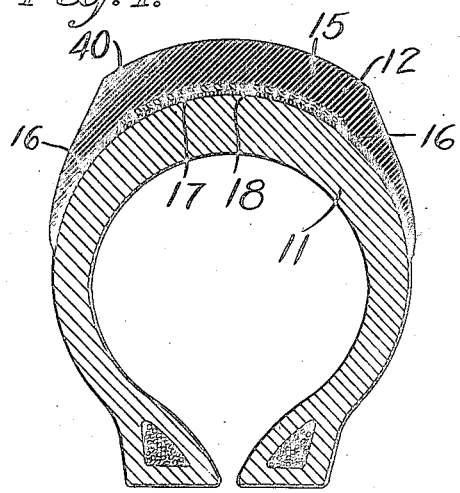
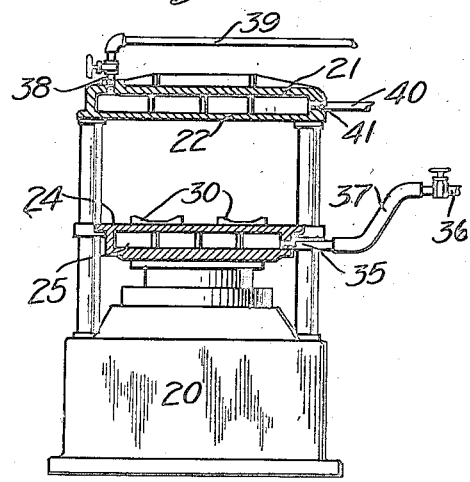
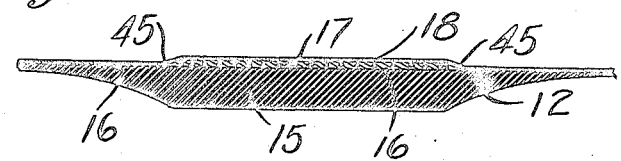
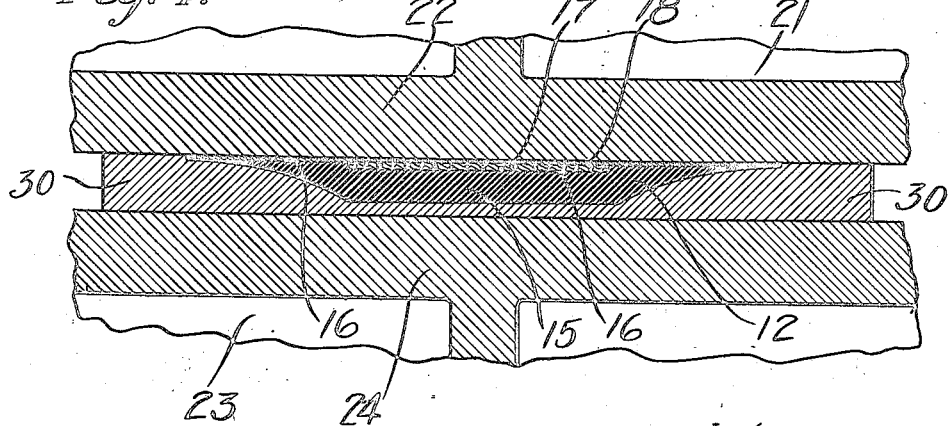
INVENTOR:
DOUGLAS R. RADFORD,
BY
ATTORNEYS.

UNITED STATES PATENT OFFICE.

DOUGLAS R. RADFORD, OF LOS ANGELES, CALIFORNIA.

RETREAD FOR TIRES AND METHOD OF MAKING THEM.

1,426,672.

Specification of Letters Patent.   Patented Aug. 22, 1922.

Application filed October 20, 1921. Serial No. 508,912.

*To all whom it may concern:*

Be it known that I, DOUGLAS R. RADFORD, a subject of the King of England, residing at Los Angeles, in the county of Los Angeles and State of California, have invented new and useful Retreads for Tires and Methods of Making Them, of which the following is a specification.

My invention relates to automobile tires, being more particularly a tread for outer casings such as are used on pneumatic tires.

It has become the practice of lengthening the life of casings of the class described by retreading the tire or casing if the same has become partially worn, and, for this purpose, treads have been placed upon the market which are usually made of three parts; the outer or tread portion, a breaker strip, and a cushion strip; the breaker strip being composed of fabric impregnated with green rubber, such breaker strip being narrower in width than the tread and the cushion strip. These treads are placed upon the worn casing with the cushion strip against the casing and when so placed the retread is vulcanized to the casing.

Treads of this class have been supplied in two different forms. In one form, the tread or thicker portions consists of partially vulcanized rubber. On the inside of the tread is placed the breaker strip of canvas and green rubber. The breaker strip is covered by a thin strip of green rubber called the cushion strip which is wider than the breaker strip and covers the entire back of the tread.

The fault with such treads is that when the tread portion is partially vulcanized bloom takes place on the surface of the rubber which is in fact a collection of sulphur from the rubber on the face of the tread. When the breaker strip and cushion are applied to the inner side of such vulcanized tread the sulphur on the face of the tread prevents a proper vulcanization between the breaker strip, the cushion strip and the tread during the operation of vulcanizing the retread to the tire.

A further objection to such forms of tread is that a ridge or shoulder is formed along each edge of the breaker strip which results in the forming of air pockets between the retread and the tire during vulcanization, which pockets are difficult to remove and if not properly removed detract materially from the life of the tire.

In another form of tread placed on the market, the tread, the breaker strip and the cushion strip are all of green material in which case the same difficulty is encountered of air cushions being formed along the edge of the breaker strip; also, when a green tread is placed in the common form of vulcanizing mold for vulcanizing to the tire the green rubber is forced out between the sections of which the mold is formed, this results in loss of rubber and additional work of trimming the finished job.

With my retread I overcome all of these objectionable features in the common forms of retread referred to and I accomplish this result by placing the tread with breaker strip thereon and the cushion strip all of green rubber in a vulcanizing press in which heat is applied to the tread only.

I provide means for cooling the other face of the retread, that is, the cushion strip, so that the retread when finished consists of a tread, breaker strip and cushion strip, the tread being partially vulcanized, such vulcanization diminishing toward the breaker strip and leaving the cushion strip of green rubber. The operation, however, permits the breaker strip to imbed in the tread portion so that the inner face of the cushion strip is entirely free, thereby presenting a green even surface to be placed upon the worn tread of the tire to be retreaded.

It is an object of my invention to provide a tread for tires which may be applied to a tire without the necessity of further treatment.

It is a further object of my invention to provide a reinforced tire tread, formed in such a manner that it may be applied in the same manner as a single strip of rubber, yet having considerably greater strength.

It is a further object of my invention to provide a tread which may be applied to a tire without the formation of air pockets between the tread and the tire.

It is a further object of my invention to provide a tread in which sulphur will not bloom upon the under surface thereof.

Other objects and advantages will appear hereinafter from the following specification and drawings.

Referring to the drawing, which is for illustrative purposes only:

Fig. 1 is a sectional view of the tire having a tread of my invention mounted thereupon.

Fig. 2 is a diagrammatic representation of an apparatus I employ in manufacturing my invention.

Fig. 3 is a cross sectional view through a tread strip in one of the stages of its manufacture.

Fig. 4 is a sectional detail showing a tread of my invention, being compressed in the vulcanizing mold I employ.

In Fig. 1 of the drawing I show a tire 11 having a tread 12 embodying my invention vulcanized thereupon. This tread 12 is comprised of a tread strip 15 having impressed into the surface thereof 16 a breaker strip 17 and a strip of cushion rubber 18. The breaker strip 17 consists of heavy cotton fabric impregnated with raw or green rubber and is used in the composition of the tread 12 for the purpose of reinforcement.

The tread 12 may be satisfactorily manufactured in the press 20, illustrated in Fig. 2, which is provided with a stationary head 21 providing a plate 22, and a movable head 23 providing a plate 24. The strip of tread rubber 15, the breaker strip 17 and the cushion rubber 18 are placed together as shown in Fig. 3 and upon being so combined, the strips are placed in moulds 30 which provide the proper contour of the tread 12, and the moulds 30 are normally disposed upon the plate 24 of the press head 23 which may be raised against the head 21 hydraulically, or otherwise as convenient. The head 23 is of hollow construction and has connected thereto a steam inlet 35 which is joined to steam piping 36 through a flexible hose 37. The head 21 is also of hollow construction and has leading thereinto at 38 cold water piping 39, and discharge piping 40 leads from the head 21 from a point 41.

By the use of this apparatus I am able to produce a tread strip which will present an absolutely smooth surface for engagement with a tire and which engaging surface will remain entirely free from sulphur for an indefinite period of time, and in which strip there will be no formations of sulphur between the tread rubber and the breaker strip; also the tread produced in this apparatus will be of ample solidity for the uses in which it is intended to be utilized. I prevent the bloom of sulphur upon the underside of the tread rubber 15 by combining the strip 15 in raw condition with the strips 17 and 18, as hereinbefore described, and subjecting these combined strips to very high pressure in molds 30, and while the strips are being so compressed subjecting the outer surface 40 of the tread rubber 15 to the vulcanizing action of heat. This heat is furnished by the presence of steam in the head 23, the heat being convected through the plate 24 and the mould 30 into the strip 15.

Simultaneously with the application of heat to the tread, I direct a flow of cold water through the piping 39 into the head 21 which maintains the plate 22 at a low temperature. When the tread 12 is being compressed in the press 20, the plate 22 is in contact with the raw cushion strip 18 and maintains the parts in which it is in contact at a temperature considerably below the vulcanizing point of the rubber. As the heat entering the outer surface 40 of the tread rubber strip 15 becomes dissipated as it progresses inwardly, the extent to which the rubber is vulcanized decreases correspondingly to the temperature to which it is subjected, there being no definite line of division between the vulcanized outer portion and the raw inner surface of the tread. In this manner I am able to vulcanize the outer surface 40 and yet maintain the inner surface 16 and the breaker and cushion strips 17 and 18 in substantially raw or green condition, and as no bloom of sulphur occurs upon the surface of raw rubber when protected from air, the inner surface of the tread strip 15 will remain absolutely free from formations of sulphur and in a condition to form a homogenous structure when cemented and vulcanized upon a tire, owing to the entire removal of air from between the strips forming the tread by the application of pressure during the manufacture thereof.

In the ordinary types of tread strips which are formed by combining breaker and cushion strips with either raw or partially vulcanized tread strips, shoulders such as appear at 45 in Fig. 3 are encountered. When these threads are placed upon a tire they must be very carefully rolled to force the air from the channels formed by the shoulders 45. My process provides an absolutely smooth surface upon the underside of the tread 12 under which air pockets are not liable to form owing to the absence of irregularities in the surface in which to capture air.

It is not necessary in the practice of my invention to adhere to the particular combination of parts treated in the foregoing specification, as it is sometimes customary to omit the breaker strip from the combination, it also being common for consumers to buy tread strips or combined tread and breaker strips and mount the cushion strip thereupon as occasion for use arises.

I claim as my invention:

1. In the manufacture of treads for tires, the method of placing a raw breaker strip between a strip of raw tread rubber and a strip of cushion rubber, and subsequently subjecting said combined strips to pressure between suitably formed plates, said plate adjacent to said tread rubber being heated to cause the vulcanization of the outer portion of said tread rubber, and said plate adjacent to said cushion rubber being maintained at a low temperature to prevent the vulcanization of the rubber adjacent thereto.

2. In the manufacture of treads for tires, the method of suitably combining layers of rubber and fabric, and subsequently subjecting said combined layers to pressure between suitably formed plates, one of said plates being heated to cause the vulcanization of the rubber proximate thereto, and the other of said plates being maintained at a low temperature to prevent the vulcanization of the rubber proximate to said other plate.

3. In the manufacture of treads for tires, the method of placing a raw breaker strip between a strip of raw tread rubber and a strip of cushion rubber, subjecting said combined strips to compression, and subsequently heating the surface of said tread rubber to vulcanize the outer portion of said tread rubber, said other surface of said tread being maintained at a low temperature to prevent vulcanization of said rubber forming said other surface.

4. In the manufacture of treads for tires, the method of suitably combining layers of rubber and fabric, subjecting said combined layers to compression, and simultaneously applying heat to one surface of said combination of layers to vulcanize the rubber proximate thereto, said opposite surface to said heated surface being maintained at a low temperature to prevent vulcanization of the rubber forming said opposite surface.

5. In the manufacture of treads for tires, the method of placing a raw breaker strip between a strip of raw tread rubber and a strip of cushion rubber, and subsequently heating the surface of said tread rubber to vulcanize the outer portion of said tread rubber, said other surface of said tread being maintained at a low temperature to prevent vulcanization of said rubber forming said other surface.

6. In the manufacture of treads for tires, the method of suitably combining layers of rubber and fabric, and subsequently applying heat to one surface of said combination of layers to vulcanize the rubber proximate thereto, said opposite surface to said heated surface being maintained at a low temperature to prevent vulcanization of the rubber forming said opposite surface.

7. The method of solidifying raw rubber stock to be vulcanized upon other raw or vulcanized stock which comprises applying heat to one surface of said stock to vulcanize the rubber proximate to said surface, and simultaneously maintaining the other surface at a low temperature to prevent the vulcanization of the rubber proximate to said opposite surface.

8. A tread for tires comprising an outer tread strip, a cushion strip and a breaker strip between said tread strip and cushion strip imbedded therein, said tread being decreasingly vulcanized from its outer face inwardly to a green inner face.

9. A tread for tires comprising a strip of rubber decreasingly vulcanized from its outer face inwardly to a green inner face.

In testimony whereof, I have hereunto set my hand at Los Angeles, California, this 14th day of October, 1921.

DOUGLAS R. RADFORD.